(12) United States Patent
Singh et al.

(10) Patent No.: US 8,948,802 B1
(45) Date of Patent: Feb. 3, 2015

(54) CONDITIONAL WIRELESS COMMUNICATION CHANNEL FOR A WIRELESS COMMUNICATION DEVICE

(75) Inventors: Jasinder Pal Singh, Olathe, KS (US); Jason Peter Sigg, Overland Park, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 587 days.

(21) Appl. No.: 13/178,745

(22) Filed: Jul. 8, 2011

(51) Int. Cl.
*H04B 7/00* (2006.01)

(52) U.S. Cl.
USPC .......................................... 455/513; 455/62

(58) Field of Classification Search
CPC ........................... H04W 24/10; H04W 72/082
USPC ........................................................ 455/513
See application file for complete search history.

(56) References Cited

U.S. PATENT DOCUMENTS

| | | | |
|---|---|---|---|
| 5,519,884 A | 5/1996 | Duque-Anton et al. | |
| 6,564,055 B1 | 5/2003 | Hronek | |
| 6,625,451 B1 | 9/2003 | La Medica, Jr. et al. | |
| 6,961,583 B2 | 11/2005 | Moles et al. | |
| 7,260,394 B2 | 8/2007 | Welnick et al. | |
| 7,349,695 B2 * | 3/2008 | Oommen et al. | 455/432.1 |
| 7,398,082 B2 * | 7/2008 | Schwinke et al. | 455/419 |
| 7,593,365 B1 | 9/2009 | Delker et al. | |
| 7,593,730 B2 | 9/2009 | Khandelwal et al. | |
| 7,603,119 B1 | 10/2009 | Durig et al. | |
| 7,835,741 B2 * | 11/2010 | Lee et al. | 455/435.2 |
| 7,925,256 B2 * | 4/2011 | Oommen et al. | 455/432.1 |
| 8,068,808 B2 * | 11/2011 | Smith | 455/404.2 |
| 8,213,931 B2 * | 7/2012 | George et al. | 455/432.1 |
| 8,364,142 B1 * | 1/2013 | Berberian et al. | 455/432.1 |
| 8,781,464 B2 * | 7/2014 | Swaminathan | 455/434 |
| 2003/0083064 A1 * | 5/2003 | Cooper | 455/432 |
| 2004/0110503 A1 * | 6/2004 | Park | 455/435.1 |
| 2004/0152462 A1 * | 8/2004 | Hwang | 455/432.1 |
| 2004/0192304 A1 * | 9/2004 | Casaccia et al. | 455/435.1 |
| 2004/0203692 A1 * | 10/2004 | Schwinke et al. | 455/419 |
| 2004/0203745 A1 * | 10/2004 | Cooper | 455/432.1 |
| 2005/0064901 A1 * | 3/2005 | Park et al. | 455/556.1 |
| 2005/0148332 A1 * | 7/2005 | Buckley et al. | 455/435.2 |

(Continued)

OTHER PUBLICATIONS

U.S. Appl. No. 12/652,828, filed Jan. 6, 2010.

(Continued)

*Primary Examiner* — Hai V Nguyen

(57) ABSTRACT

A method of operating a wireless communication device comprises storing initial data in a first wireless channel table that associates a geographic identifier, a network availability signal, and a first wireless communication channel. New data is received that associates the geographic identifier, the network availability signal, and a second wireless communication channel. The initial data is compared to the new data to determine that the first wireless communication channel in the initial data changed to the second wireless communication channel associated in the new data. A conditional statement is generated that directs the wireless communication device to utilize the first wireless communication channel for the geographic identifier if a performance metric of the second wireless communication channel fails to meet a performance standard. The conditional statement is stored along with the new data that associates the geographic identifier, the network availability signal, and the second wireless communication channel in a second wireless channel table.

20 Claims, 6 Drawing Sheets

(56) References Cited

U.S. PATENT DOCUMENTS

| | | |
|---|---|---|
| 2005/0227688 A1 | 10/2005 | Li et al. |
| 2005/0282544 A1* | 12/2005 | Oommen et al. ........... 455/432.1 |
| 2006/0052092 A1* | 3/2006 | Schwinke et al. ............ 455/415 |
| 2006/0252426 A1 | 11/2006 | Hossain et al. |
| 2008/0064393 A1* | 3/2008 | Oommen et al. .......... 455/432.1 |
| 2008/0132229 A1* | 6/2008 | Oommen et al. .......... 455/432.3 |
| 2009/0067447 A1* | 3/2009 | Giaimo et al. ................ 370/431 |
| 2009/0264094 A1* | 10/2009 | Smith ....................... 455/404.2 |
| 2011/0217977 A1* | 9/2011 | Du et al. .................... 455/432.1 |
| 2012/0208534 A1* | 8/2012 | Swaminathan .............. 455/434 |

OTHER PUBLICATIONS

U.S. Appl. No. 13/154,648, filed Jun. 7, 2011.

\* cited by examiner

| GEO | SID/NID | PROVIDER | FREQUENCY | CONDITION |
|---|---|---|---|---|
| REGION 330 | 4139/65535 | COMM NET 320 | 1900 MHz | IF RSSI < 25 THEN USE OLD 800 MHz CHANNEL |
| REGION 330 | 00056/65535 | COMM NET 340 | 1900 MHz | NONE |

PREFERRED ROAMING LIST 400

FIGURE 4

CONDITIONAL WIRELESS COMMUNICATION CHANNEL FOR A WIRELESS COMMUNICATION DEVICE

TECHNICAL BACKGROUND

A wireless communication device is commonly associated with a particular wireless network, often referred to as a home wireless network. Typically, a wireless network operator does not have proprietary ownership of wireless coverage across all geographic regions where service is offered. Instead, most wireless network operators allow their associated users to access wireless communication services from partnering, visited wireless networks. This practice, termed roaming, enables users to receive wireless communication services in the largest possible geographic area. However, when a wireless communication device that is "homed" to a particular wireless network roams in a visited wireless network, the home wireless network operator must often pay predetermined fees to the visited wireless network operator.

Presently, a wireless network service provider may configure a user's wireless communication device with a preferred roaming list (PRL). The PRL typically provides a listing of visited wireless networks that the wireless communication device may attempt to communicate with whenever suitable wireless communication service cannot be provided by the home wireless network operated by the wireless network service provider. The PRL is typically prioritized to assist the wireless communication device in selecting the most preferable visited wireless network for the wireless network operator while still meeting the service requirements of the user.

Overview

A method of operating a wireless communication device is disclosed. The method comprises storing initial data in a first wireless channel table that associates a geographic identifier, a network availability signal, and a first wireless communication channel. The method further comprises receiving new data that associates the geographic identifier, the network availability signal, and a second wireless communication channel. The method further comprises comparing the initial data to the new data to determine that the first wireless communication channel associated with the geographic identifier in the initial data changed to the second wireless communication channel associated with the geographic identifier in the new data. The method further comprises generating a conditional statement that directs the wireless communication device to utilize the first wireless communication channel for the geographic identifier if a performance metric of the second wireless communication channel fails to meet a performance standard. The method further comprises storing the conditional statement along with the new data that associates the geographic identifier, the network availability signal, and the second wireless communication channel in a second wireless channel table.

A wireless communication device comprises a processing system and a wireless communication transceiver. The processing system is configured to store initial data in a first wireless channel table that associates a geographic identifier, a network availability signal, and a first wireless communication channel. The wireless communication interface is configured to receive new data that associates the geographic identifier, the network availability signal, and a second wireless communication channel. The processing system is configured to compare the initial data to the new data to determine that the first wireless communication channel associated with the geographic identifier in the initial data changed to the second wireless communication channel associated with the geographic identifier in the new data, generate a conditional statement that directs the wireless communication device to utilize the first wireless communication channel for the geographic identifier if a performance metric of the second wireless communication channel fails to meet a performance standard, and store the conditional statement along with the new data that associates the geographic identifier, the network availability signal, and the second wireless communication channel in a second wireless channel table.

BRIEF DESCRIPTION OF THE DRAWINGS

FIG. 4 is a block diagram that illustrates a preferred roaming list in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
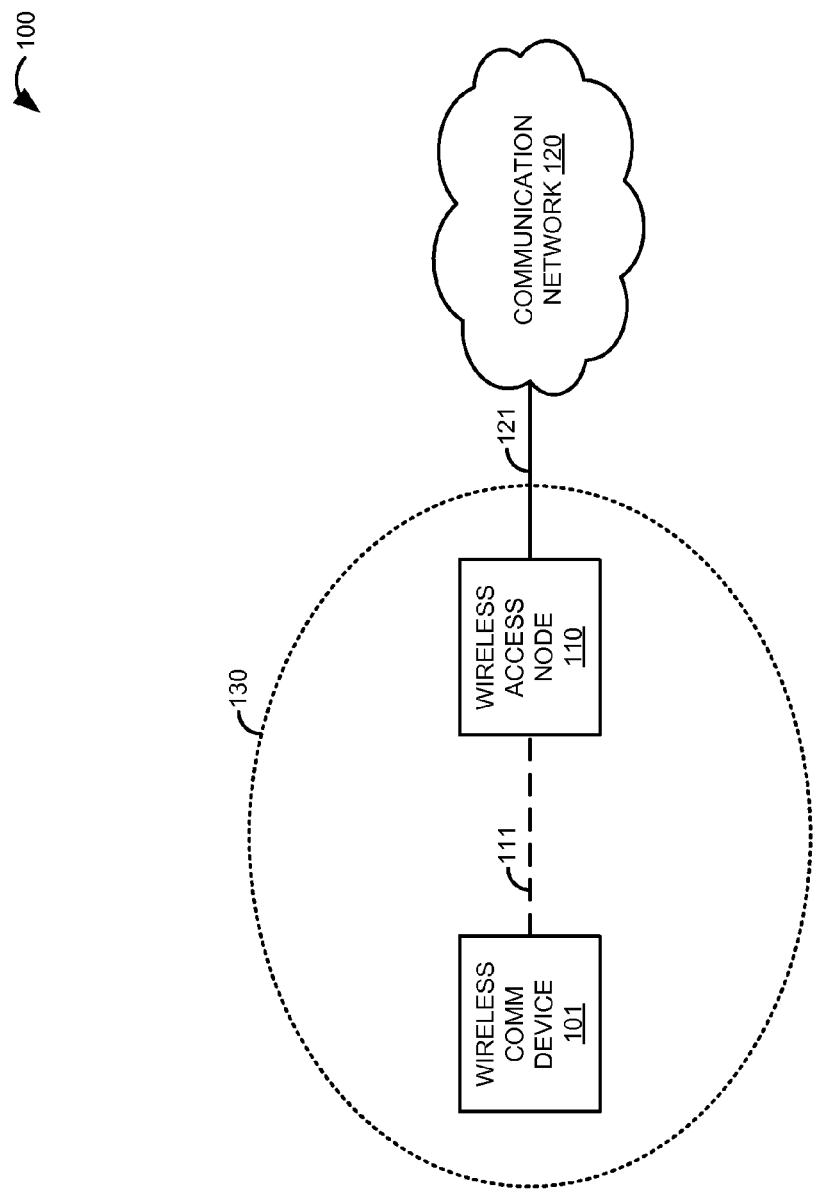
FIG. 1 is a block diagram that illustrates a communication system.

FIG. 1 is a block diagram that illustrates communication system 100. Communication system 100 includes wireless communication device 101, wireless access node 110, and communication network 120. Wireless communication device 101 and wireless access node 110 are in communication over wireless communication link 111. Wireless access node 110 and communication network 120 communicate over communication link 121. Wireless communication device 101 is located within geographic region 130, which is represented by the area within the dotted line on FIG. 1.

Figure 2:
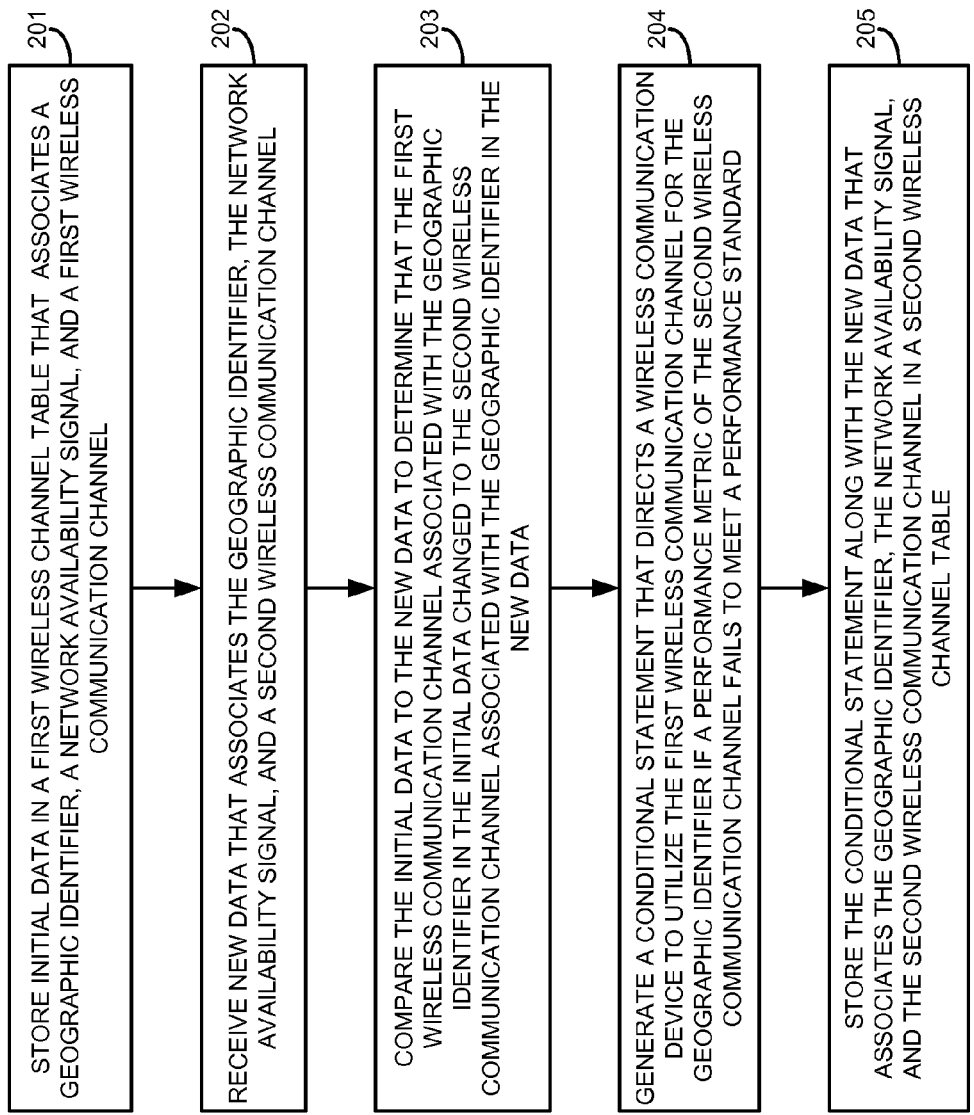
FIG. 2 is a flow diagram that illustrates an operation of the communication system.

FIG. 2 is a flow diagram that illustrates an operation of communication system 100. The steps of the operation are indicated below parenthetically. To begin, wireless communication device 101 stores initial data in a first wireless channel table that associates a geographic identifier, a network availability signal, and a first wireless communication channel (201). Typically, wireless communication device 101 receives the initial data from communication network 120 prior to storage. In some examples, the first wireless channel table in which wireless communication device 101 stores the initial data could comprise a preferred roaming list.

The geographic identifier included in the initial data typically identifies a geographic area served by wireless access node 110 and/or communication network 120, and could comprise government-defined areas such as cities, counties, or other municipalities. In some examples, the geographic identifier could comprise any code or name that may be correlated to a network availability signal, such as the network availability signal included in the initial data stored by wireless communication device 101. The network availability signal could comprise a code or other information that is associated with communication network 120 and the geographic identifier. In some examples, the network availability signal could comprise a system identification number and/or network identification number of communication network 120.

The first wireless communication channel stored by wireless communication device 101 in the initial data could comprise any data that facilitates establishment of a wireless communication link 111 between wireless communication device 101 and wireless access node 110 for eventual communication with communication network 120. Some examples of a wireless communication channel include frequency allocations, time slot allocations, and combinations of frequencies and time slots that may be used in orthogonal frequency division multiplexing (OFDM)-based technologies.

Wireless communication device 101 receives new data that associates the geographic identifier, the network availability signal, and a second wireless communication channel (202). The new data is typically transmitted by wireless access node 110 and received by wireless communication device 101 via a wireless communication transceiver, although device 101 may receive the new data in a variety of ways, including importing the data from another computer system or universal serial bus (USB) flash drive, manual entry of the data by a user of device 101, downloading the new data over another communication network other than communication network 120 via a Wi-Fi, Bluetooth, or some other data connection, and other like techniques. Typically, the second wireless communication channel included in the new data is intended as a substitute for the first wireless communication channel in the initial data for the same geographic identifier and network availability signal. For example, the first wireless communication channel could indicate a first radio frequency (RF) band class, and the second wireless communication channel could be associated with a second, different RF band class. In some examples, wireless communication device 101 could receive the new data in the form of an updated preferred roaming list for device 101.

Wireless communication device 101 then compares the initial data to the new data to determine that the first wireless communication channel associated with the geographic identifier in the initial data changed to the second wireless communication channel associated with the geographic identifier in the new data (203). Typically, wireless communication device 101 would compare the wireless communication channels for all geographic identifiers included in the initial data and the new data to determine whether any of the channels have changed between the initial data and the new data. In some examples, wireless communication device 101 could store these deltas in a memory system of device 101 for future reference.

Wireless communication device 101 generates a conditional statement that directs wireless communication device 101 to utilize the first wireless communication channel for the geographic identifier if a performance metric of the second wireless communication channel fails to meet a performance standard (204). Typically, the performance metric of the second wireless communication channel and the performance standard are comparable status indications in compatible units. In some examples, wireless communication device 101 could determine the performance standard based on historical data that indicates a level of performance previously provided by the first wireless communication channel when device 101 was operated in a geographic region 130 identified by the geographic identifier. For example, the performance standard could comprise threshold levels of received signal strength, signal-to-noise, carrier-to-noise-and-interference, and other RF quality measurements, a maximum number of connection failures by wireless communication device 101, including dropped calls, dropped packets, and other connection errors, a threshold communication loading level of a backhaul communication link 121 of wireless access node 110, a maximum number of users and/or devices in communication with wireless access node 110, and other performance standards—including combinations thereof. Likewise, the performance metrics of the second wireless communication channel could comprise comparable metrics, such as a received signal strength indicator (RSSI) value, signal-to-noise ratio (SNR), carrier-to-noise-and-interference ratio (CNIR), a number of connection failures, backhaul link communication loading level, a number of users and/or devices utilizing wireless access node 110, and other communication performance metrics.

Wireless communication device 101 stores the conditional statement along with the new data that associates the geographic identifier, the network availability signal, and the second wireless communication channel in a second wireless channel table (205). In some examples, the second wireless channel table in which wireless communication device 101 stores the conditional statement along with the new data could comprise a preferred roaming list. Thus, in addition to storing the geographic identifier, the network availability signal, and the second wireless communication channel received in the new data, wireless communication device 101 includes the conditional statement that directs device 101 to utilize the first wireless communication channel for the geographic identifier if a performance metric of the second wireless communication channel fails to meet a performance standard.

Advantageously, by comparing the initial data to the new data to determine that the first wireless communication channel was changed to the second wireless communication channel, wireless communication device 101 can identify and store this delta between the initial data and the new data, thereby effectively providing additional wireless communication channels for device 101 to utilize beyond what is included in the new data. For example, in the event that a performance metric of the second wireless communication channel fails to meet a performance standard previously achieved by the first wireless communication channel of the initial data, wireless communication device 101 could switch to the first wireless communication channel based on the conditional statement. In this manner, network resources are better utilized, the user experience is improved, and utilization of visited communication networks may be reduced, resulting in decreased roaming charges.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Geographic region 130 comprises any designated area of land and/or water. Typically, geographic region 130 is defined by a geographic identifier. Some examples of geographic region 130 include areas defined by governmental boundaries such as a town, city, or state, base station coverage areas such as a cell or sector, areas defined by latitudes and longitudes, or any other definite geographic area.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
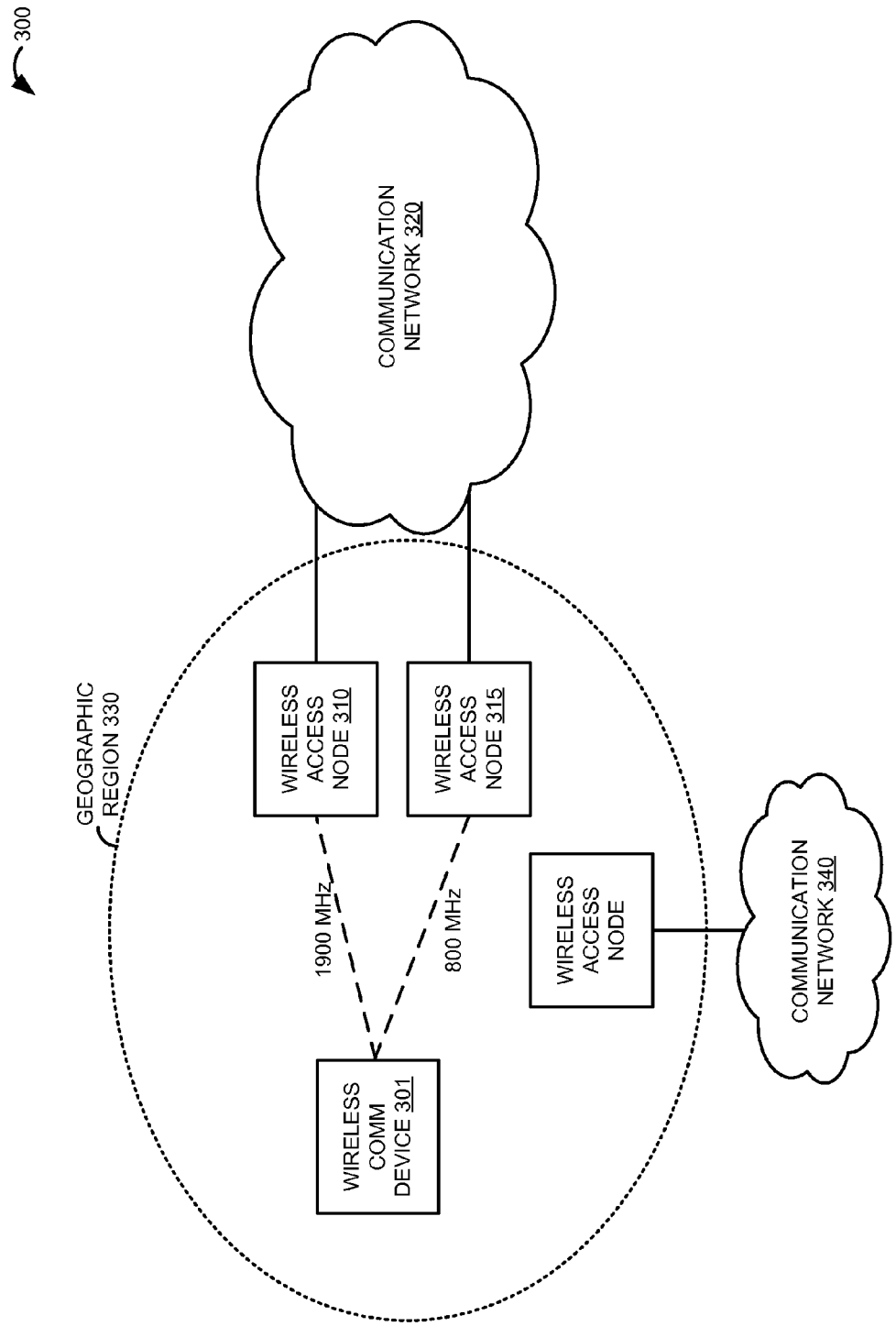
FIG. 3 is a block diagram that illustrates a communication system in an exemplary embodiment.
Figure 5:
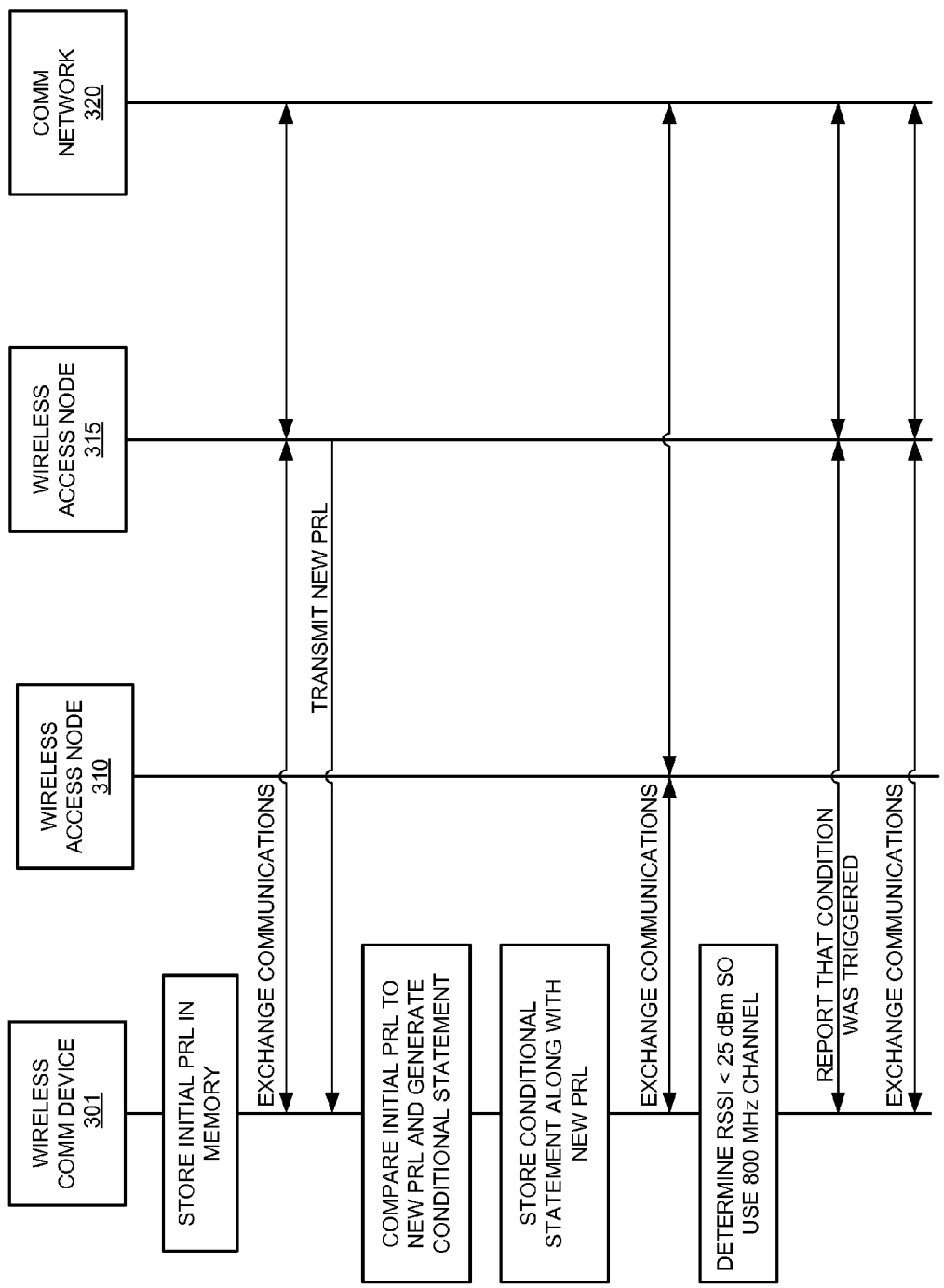
FIG. 5 is a sequence diagram that illustrates an operation of a communication system in an exemplary embodiment.

FIG. 3 is a block diagram that illustrates communication system 300 in an exemplary embodiment. Communication system 300 includes wireless communication device 301, wireless access nodes 310 and 315, communication networks 320 and 340, and geographic region 330. Wireless communication device 301 provides an example of wireless communication device 101, although device 101 may use alternative configurations. In this example, wireless communication device 301 is a subscriber of communication network 320 for wireless communication services, such that wireless communication device 101 is "homed" to network 320. Wireless access node 310 operates at a 1900 megahertz (MHz) frequency for EV-DO wireless communications, and wireless access node 315 operates at 800 MHz. Both wireless access nodes 310 and 315 are associated with home communication network 320. Communication network 340 is operated by a different communication service provider from network 320, and the wireless access node associated with network 340 operates at a 1900 MHz frequency for EV-DO. The following description of FIGS. 4 and 5 provides an exemplary technique for wireless communication device 301 to keep track of the wireless channel information associated with the 800 MHz wireless link provided by wireless access node 315 when a new preferred roaming list (PRL) is acquired by device 301 that replaces the 800 MHz channel for geographic region 330 with the 1900 MHz channel provided by wireless access node 310.

FIG. 4 is a block diagram that illustrates preferred roaming list 400 in an exemplary embodiment. A preferred roaming list (PRL) comprises a table or set of tables that allow a wireless communication device 301 to select a communication network 320 or 340 and acquire the appropriate wireless channel to operate on the selected network. In a CDMA network, PRLs typically comprise two functional tables: an acquisition table and a system table. An acquisition table includes an indexed list of channels or frequencies that wireless communication device 301 may use to gain access to particular communication networks 320 and 340 via their associated wireless access nodes. The information contained in each acquisition table comprises an index, the network type, and associated channel blocks. A system table includes system identification numbers (SIDs) and network identification numbers (NIDs). SIDs identify a geographic region 330 such as the area of a city or large town. NIDs are an optional subdivision of a SID.

In this example, PRL 400 is stored in wireless communication device 301. PRL 400 comprises a table with columns labeled "GEO", "SID/NID", "PROVIDER", "FREQUENCY", and "CONDITION". The GEO field indicates a geographic area associated with each SID/NID pair. In this example, the GEO field is geographic region 330 for all the SID/NID pairs shown. The first value in the SID/NID field is 4139/65535, which is associated with communication network 320 as shown in the "PROVIDER" field and may be used by wireless communication device 301 to access network 320. The "FREQUENCY" column provides wireless communication channels that are associated with the SID/NID pairs. In this example, the first SID/NID pair of 4139/65535 for communication network 320 indicates a block of available frequencies/time slots in the 1900 MHz band. Wireless communication device 301 can therefore scan for the channels indicated in this 1900 MHz frequency band to operate on communication network 320. The second row of PRL 400 includes similar information for a 1900 MHz channel provided by communication network 340 for geographic region 330. Since utilizing communication network 340 would incur roaming charges for wireless communication device 301 which is homed to communication network 320, PRL 400 directs wireless communication device 301 to first attempt to utilize the 1900 MHz communication channel provided by communication network 320 prior to scanning for the 1900 MHz communication channel provided by communication network 340.

The "CONDITION" field shows a conditional statement that was generated and stored by wireless communication device 301 along with this PRL data for communication network 320. In this example, before receiving the data for the 1900 MHz channel provided by communication network 320 for geographic region 330 as shown in PRL 400, wireless communication device 301 previously had a PRL with data for an 800 MHz communication channel provided by wireless access node 315 for communication network 320. Upon receiving the new PRL data that replaced the 800 MHz channel provided by wireless access node 315 with the 1900 MHz channel provided by node 310, wireless communication device 301 identified this change and stored the information for the 800 MHz channel along with the new PRL data in PRL 400. Based on historical performance data acquired by wireless communication device 301 when previously connected to the 800 MHz communication channel provided by wireless access node 315, wireless communication device 301 determines that node 315 typically provided at least a 25 dBm or higher received signal strength indication (RSSI) value for the 800 MHz channel in geographic region 330. Thus, wireless communication device 301 generates a conditional statement for the new PRL 400 as shown in the first row of the "CONDITION" field, which directs wireless communication device 301 to utilize the 800 MHz communication channel if the RSSI value of the 1900 MHz channel provided by wireless access node 310 for communication network 320 falls below the threshold value of 25 dBm. Although not shown in PRL 400, the conditional statement could include a duration requirement, where the RSSI value must fall below the threshold level for a specified amount of time.

The use of PRL 400 by wireless communication device 301 will now be described with respect to the exemplary sequence diagram of FIG. 5.

FIG. 5 is a sequence diagram that illustrates an operation of communication system 300 in an exemplary embodiment. Initially, communication network 320 transmits an initial PRL for delivery to wireless communication device 301 (not shown), which is stored in a memory system of device 301. The initial PRL stored by wireless communication device 301 includes the 800 MHz wireless communication channel provided by wireless access node 315 for geographic region 330. Thus, upon entering geographic region 330, wireless communication device 301 processes the initial PRL, and based on a geographic identifier for geographic region 330, connects to the 800 MHz wireless channel provided by wireless access node 315 and exchanges wireless communications with communication network 320 via node 315.

Wireless access node 315 next transmits a new PRL to wireless communication device 301. The new PRL includes the data shown in PRL 400 of FIG. 4, except for the conditional statement included in the "CONDITION" field, which is generated by wireless communication device 301 after receiving the new PRL data as described below.

Upon receiving the new PRL, wireless communication device 301 compares the initial PRL to the new PRL to determine the change for geographic region 330 from the 800 MHz channel to the 1900 MHz channel for communication network 320. Wireless communication device 301 then determines a performance standard for the 1900 MHz channel based on historical data associated with the performance of the 800 MHz channel for the geographic identifier associated with geographic region 330, which in this example is a threshold RSSI value of 25 dBm as discussed above with respect to PRL 400 of FIG. 4. Wireless communication device 301 then generates the conditional statement for the 1900 MHz channel provided by communication network 320 for geographic region 330, which directs wireless communication device 301 to utilize the 800 MHz communication channel if the RSSI value of the 1900 MHz channel provided by wireless access node 310 for communication network 320 falls below the threshold value of 25 dBm determined by device 301. Wireless communication device 301 also stores information associated with the 800 MHz channel in a memory system of device 301, and the conditional statement identifies a location in the memory system where the 800 MHZ channel information is stored.

After generating the conditional statement, wireless communication device 301 stores the conditional statement along with the new PRL information as shown in PRL 400 of FIG. 4. Thus, when wireless communication device 301 enters geographic region 330, device 301 processes PRL 400 to determine wireless communication channel information for connecting to a communication network 320 or 340. Initially, wireless communication device 301 connects to wireless access node 310 and exchanges communications with communication network 320 over the 1900 MHz channel provided by node 310 as directed by PRL 400. However, wireless communication device 301 eventually determines that the RSSI associated with the 1900 MHz communication link between device 301 and wireless access node 310 falls below the 25 dBm threshold previously set by device 301 in the conditional statement. Thus, wireless communication device 301 processes the conditional statement and determines that the 800 MHz channel provided by wireless access node 315 should be utilized since the performance has decreased on the 1900 MHz channel provided by node 310. Wireless communication device 301 thus accesses the 800 MHz channel information that is stored in memory and connects to wireless access node 315.

Upon connecting to wireless access node 315, wireless communication device 301 reports to communication network 320 that the conditional statement was triggered. Based on the report, a communication system of communication network 320 could record the incident and note the change for wireless communication device 301. In this manner, communication network 320 can provide a customized PRL in the future to wireless communication device 301 that is updated with the change back to the 800 MHz channel for geographic region 330.

Wireless communication device 301 then continues to exchange communications with communication network 320, but utilizes the 800 MHz channel of wireless access node 315 instead of the 1900 MHz channel of node 310. In this manner, wireless communication device 301 avoids roaming on communication network 340 when performance degrades on the 1900 MHz channel provided by node 310 for communication network 320, or when device 301 is unable to connect to the 1900 MHz channel via node 310.

In some examples, the alternative 800 MHz wireless communication channel stored by wireless communication device 301 could be utilized for other purposes. For example, when a user of wireless communication device 301 contacts an emergency service when device 301 is located in geographic region 330, such as by dialing the digits 9-1-1, device 301 could be configured to scan for the 800 MHz channel and other stored wireless communication channels associated with geographic region 330 upon failed attempts to connect to the 1900 MHz channels for networks 320 and 340 specified in PRL 400. In this manner, the user is more assured of reaching a communication network 320 or 340 for establishing a connection to the emergency service, thereby providing improved safety and security for the user.

Figure 6:
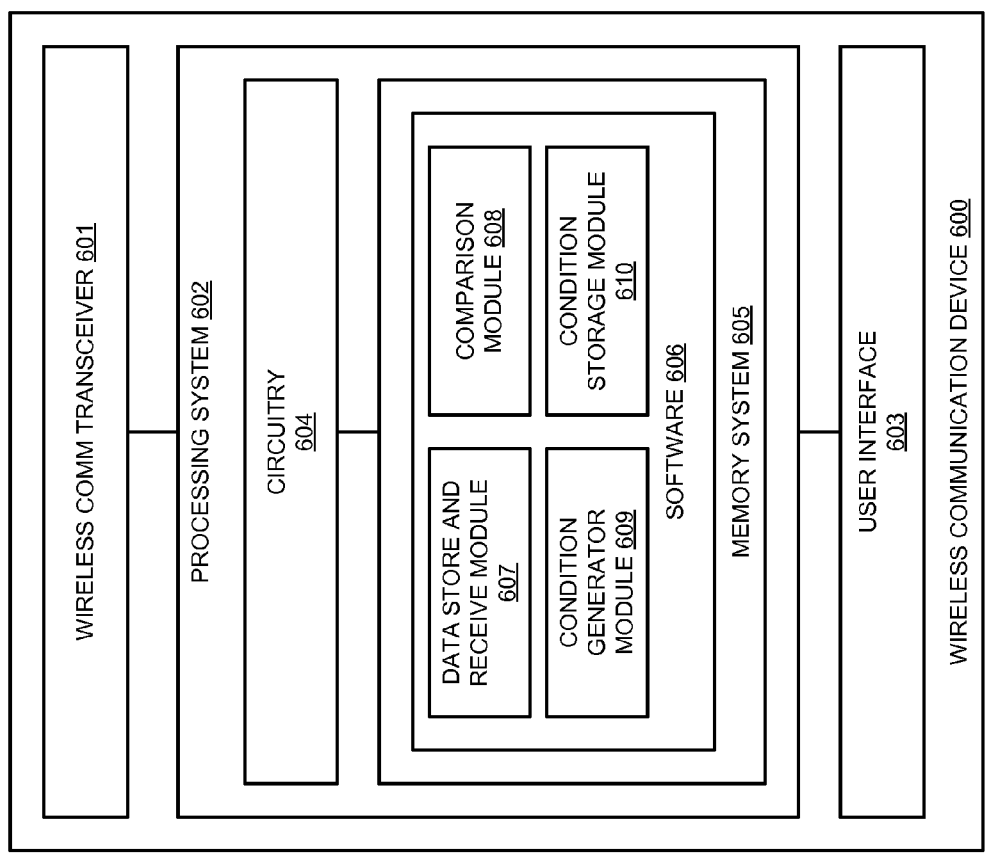
FIG. 6 is a block diagram that illustrates a wireless communication device.

FIG. 6 is a block diagram that illustrates wireless communication device 600. Wireless communication device 600 provides an example of wireless communication devices 101 and 301, although devices 101 and 301 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other wireless communication format. Wireless communication transceiver 601 is configured to receive new data that associates a geographic identifier, a network availability signal, and a second wireless communication channel.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of wireless communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication devices 101 and 301. In particular, operating software 606 directs processing system 602 to store in memory system 605 initial data in a first wireless channel table that associates a geographic identifier, a network availability signal, and a first wireless communication channel. Operating software 606 also directs processing system 602 to direct wireless communication transceiver 601 to receive new data that associates the geographic identifier, the network availability signal, and a second wireless communication channel. In addition, operating software 606 directs processing system 602 to direct wireless communication transceiver 601 to compare the initial data to the new data to determine that the first wireless communication channel associated with the geographic identifier in the initial data changed to the second wireless communication channel associated with the geographic identifier in the new data. Further, operating software 606 directs processing system 602 to generate a conditional statement that directs wireless communication device 600 to utilize the first wireless communication channel for the geographic identifier if a performance metric of the second wireless communication channel fails to meet a performance standard. Finally, operating software 606 directs processing system 602 to store in memory system 605 the conditional statement along with the new data that associates the geographic identifier, the network availability signal, and the second wireless communication channel in a second wireless channel table.

In this example, operating software 606 comprises a data storage and receive software module 607 that stores in memory system 605 initial data in a first wireless channel table that associates a geographic identifier, a network availability signal, and a first wireless communication channel, and that further receives new data that associates the geographic identifier, the network availability signal, and a second wireless communication channel. Additionally, operating software 606 comprises a comparison software module 608 that compares the initial data to the new data to determine that the first wireless communication channel associated with the geographic identifier in the initial data changed to the second wireless communication channel associated with the geographic identifier in the new data. Operating software 606 also comprises a condition generator software module 609 that generates a conditional statement that directs wireless communication device 600 to utilize the first wireless communication channel for the geographic identifier if a performance metric of the second wireless communication channel fails to meet a performance standard. Finally, operating software 606 comprises a condition storage software module 610 that stores in memory system 605 the conditional statement along with the new data that associates the geographic identifier, the network availability signal, and the second wireless communication channel in a second wireless channel table.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
    storing initial data in a first wireless channel table that associates a geographic identifier, a network availability signal, and a first wireless communication channel;
    receiving new data that associates the geographic identifier, the network availability signal, and a second wireless communication channel;
    comparing the initial data to the new data to determine that the first wireless communication channel associated with the geographic identifier in the initial data changed to the second wireless communication channel associated with the geographic identifier in the new data;
    generating a conditional statement that directs the wireless communication device to utilize the first wireless communication channel for the geographic identifier if a performance metric of the second wireless communication channel fails to meet a performance standard; and
    storing the conditional statement along with the new data that associates the geographic identifier, the network availability signal, and the second wireless communication channel in a second wireless channel table.

2. The method of claim 1 further comprising storing historical data associated with a performance of the first wireless communication channel for the geographic identifier.

3. The method of claim 2 further comprising determining the performance standard based on the historical data associated with the performance of the first wireless communication channel for the geographic identifier.

4. The method of claim 1 further comprising reporting to a communication network when the conditional statement is triggered.

5. The method of claim 1 further comprising storing the first wireless communication channel in a memory system of the wireless communication device, and wherein the conditional statement identifies a location in the memory system where the first wireless communication channel is stored.

6. The method of claim 1 wherein the performance metric comprises a received signal strength indicator and the performance standard comprises a threshold level of received signal strength.

7. The method of claim 1 wherein the performance metric comprises a carrier-to-noise-and-interference ratio and the performance standard comprises a threshold level of carrier-to-noise-and-interference.

8. The method of claim 1 wherein the performance metric comprises a number of connection failures, the performance standard comprises a maximum number of connection failures, and the performance metric fails to meet the performance standard if the number of connection failures exceeds the maximum number of connection failures.

9. The method of claim 1 wherein storing the conditional statement along with the new data that associates the geographic identifier, the network availability signal, and the second wireless communication channel in the second wireless channel table comprises storing the conditional statement along with the new data in a preferred roaming list.

10. The method of claim 1 wherein the network availability signal comprises a system identification number of a communication network.

11. A wireless communication device comprising:
    a processing system configured to store initial data in a first wireless channel table that associates a geographic identifier, a network availability signal, and a first wireless communication channel; and
    a wireless communication interface configured to receive new data that associates the geographic identifier, the network availability signal, and a second wireless communication channel;
    the processing system configured to compare the initial data to the new data to determine that the first wireless communication channel associated with the geographic identifier in the initial data changed to the second wireless communication channel associated with the geographic identifier in the new data, generate a conditional statement that directs the wireless communication device to utilize the first wireless communication channel for the geographic identifier if a performance metric of the second wireless communication channel fails to meet a performance standard, and store the conditional statement along with the new data that associates the geographic identifier, the network availability signal, and the second wireless communication channel in a second wireless channel table.

12. The wireless communication device of claim 11 further comprising the processing system configured to store historical data associated with a performance of the first wireless communication channel for the geographic identifier.

13. The wireless communication device of claim 12 further comprising the processing system configured to determine the performance standard based on the historical data associated with the performance of the first wireless communication channel for the geographic identifier.

14. The wireless communication device of claim 11 further comprising the wireless communication transceiver configured to report to a communication network when the conditional statement is triggered.

15. The wireless communication device of claim 11 further comprising the processing system configured to store the first wireless communication channel in a memory system of the wireless communication device, and wherein the conditional statement identifies a location in the memory system where the first wireless communication channel is stored.

16. The wireless communication device of claim 11 wherein the performance metric comprises a received signal strength indicator and the performance standard comprises a threshold level of received signal strength.

17. The wireless communication device of claim 11 wherein the performance metric comprises a carrier-to-noise-and-interference ratio and the performance standard comprises a threshold level of carrier-to-noise-and-interference.

18. The wireless communication device of claim 11 wherein the performance metric comprises a number of connection failures, the performance standard comprises a maximum number of connection failures, and the performance metric fails to meet the performance standard if the number of connection failures exceeds the maximum number of connection failures.

19. The wireless communication device of claim 11 wherein the processing system configured to store the conditional statement along with the new data that associates the geographic identifier, the network availability signal, and the second wireless communication channel in the second wireless channel table comprises the processing system configured to store the conditional statement along with the new data in a preferred roaming list.

20. A method of operating a wireless communication device, the method comprising:

storing initial data in a first wireless channel table that associates a geographic identifier, a network availability signal, and a first wireless communication channel;

receiving new data that associates the geographic identifier, the network availability signal, and a second wireless communication channel;

comparing the initial data to the new data to determine that the first wireless communication channel associated with the geographic identifier in the initial data changed to the second wireless communication channel associated with the geographic identifier in the new data;

storing historical data associated with a performance of the first wireless communication channel for the geographic identifier;

determining a performance standard based on the historical data associated with the performance of the first wireless communication channel for the geographic identifier;

generating a conditional statement that directs the wireless communication device to utilize the first wireless communication channel for the geographic identifier if a performance metric of the second wireless communication channel fails to meet the performance standard;

storing the conditional statement along with the new data that associates the geographic identifier, the network availability signal, and the second wireless communication channel in a second wireless channel table; and reporting to a communication network when the conditional statement is triggered.

\* \* \* \* \*